No. 680,158. Patented Aug. 6, 1901.
F. M. LIGHT.
SEAT FOR VEHICLES, &c.
(Application filed Feb. 15, 1901.)
(No Model.)
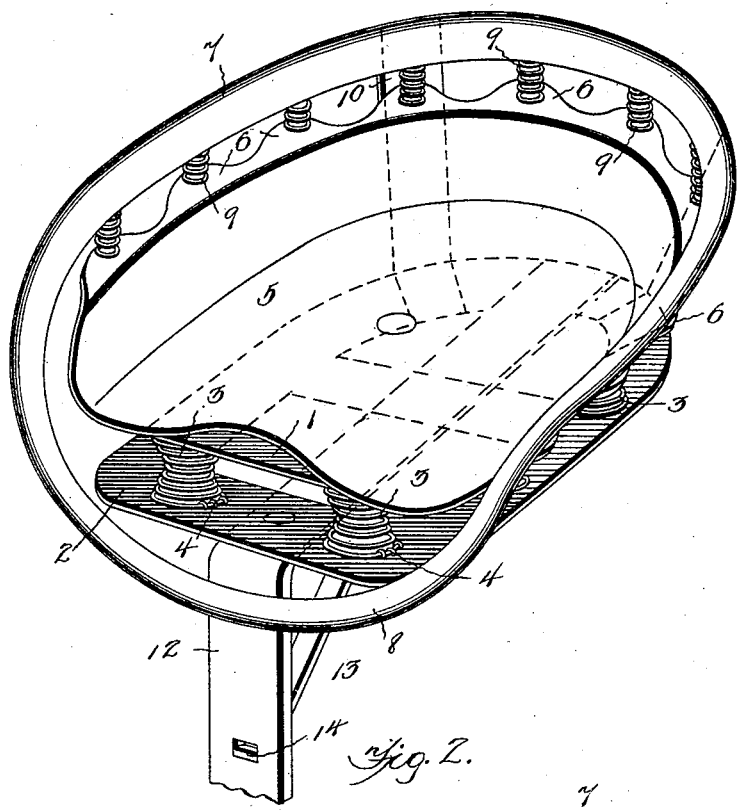
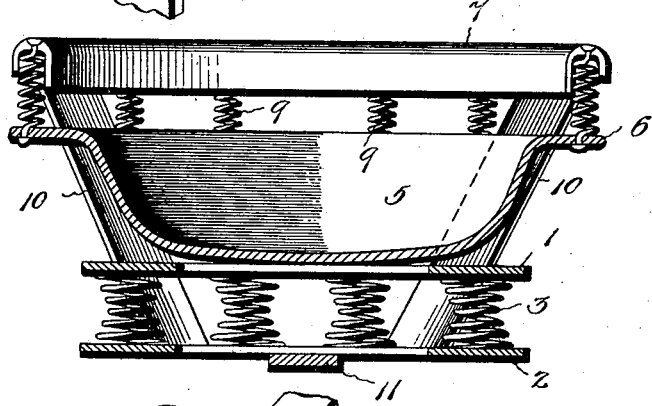
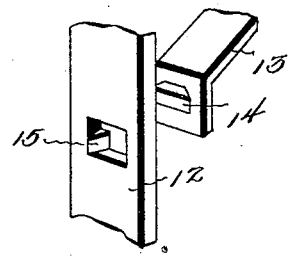
Witnesses
Inventor
Frank M. Light,
by Jas. L. Skidmore
his Attorney.
THE NORRIS PETERS CO., PHOTO-LITHO., WASHINGTON, D. C.

UNITED STATES PATENT OFFICE.

FRANK MARION LIGHT, OF EDGERTON, OHIO.

SEAT FOR VEHICLES, &c.

SPECIFICATION forming part of Letters Patent No. 680,158, dated August 6, 1901.

Application filed February 15, 1901. Serial No. 47,495. (No model.)

*To all whom it may concern:*

Be it known that I, FRANK MARION LIGHT, a citizen of the United States, residing at Edgerton, in the county of Williams and State of Ohio, have invented certain new and useful Improvements in Seats for Vehicles, &c.; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to seats for vehicles in general, but is designed more particularly for use with agricultural machinery; and the object of the invention is to provide a comfortable, substantial, and efficient seat for vehicles, which will take up all the jars and vibrations of the vehicle while passing over rough surfaces. Agricultural implements of that character mounted upon wheels and provided with seats for the driver are comparatively rigid and unyielding, and of necessity must be in order to properly perform their functions. The seats for such implements are usually mounted upon some rigid part of the machine, and as a result the driver is subjected to many severe jars and shocks while working on rough ground.

It is the object of my invention to provide a spring-seat for this class of machines, as well as for all purposes for which it may be utilized, and which will not only be more comfortable to the driver, but will absorb much of the vibration produced by the machine and reduce the wear on the various parts of the implement or vehicle. I attain these objects by means of the construction illustrated in the accompanying drawings, in which—

Figure 1 is a perspective view of a vehicle-seat made in accordance with my invention. Fig. 2 is a transverse section thereof. Fig. 3 is a detail view showing a brace and its manner of connection to the seat.

Referring to the drawings, the numerals 1 2 designate the two supports or a framework for a series of springs 3. These supports may be of skeleton form, as shown, and the springs 3 may be secured to the supports by staples or other fastenings 4. The seat 5 rests upon and is secured to the upper support 1, and at the upper portion of the seat a series of lugs 6 extends outward therefrom. An arm-rest 7 of substantially the same contour as the outer edge of the seat has a downwardly-extending fender 8, and this arm-rest is connected to the lugs 6 by a series of springs 9, said springs being secured to the arm-rest and to the lugs in any suitable manner. Braces 10 are secured to the rear corners of the arm-rest 7 and extend down to the support 2, to which they are also secured in any suitable manner. A shank or bracket 11 is secured to the lower support 2, and the vertical member 12 of said shank is designed to fit into a slot or opening in any fixed part of the machine or vehicle. A diagonal brace 13 may be used and may be provided with dovetailed ends 14 to fit corresponding grooves 15, formed in the brackets 11.

From the foregoing it will be understood that the two series of springs 3 and 9 act as compensators—that is to say, the springs 3 are compressed, while the springs 9 are extended, and vice versa, the seat 5 being supported upon the springs 3 and suspended upon the springs 9. The springs 9 thus serve to hold the seat centrally over the springs 3 and to return the seat to its normal position after a sidewise thrust is caused by the vehicle striking an obstruction.

It will be understood, of course, that instead of spiral springs, such as those shown in the drawings, I may use flat or leaf springs, or even india-rubber springs, if found desirable.

What I claim is—

1. A seat for vehicles mounted upon springs and suspended from a separate series of springs.

2. A seat for vehicles resting upon a series of springs and suspended from an independent series of springs, substantially as described.

3. A seat comprising a yielding support, a seat mounted upon said support, said seat being suspended from a series of springs.

4. The combination with a seat resting upon springs, of an arm-rest above the seat, and a series of springs connected to the seat and to the arm-rest, substantially as described.

5. The combination of an upper and lower support, with a series of springs secured to said supports, a seat resting on the upper support, an arm-rest supported by braces from said lower support, and an independent series of springs secured to said seat and to the arm-rest, substantially as described.

In testimony whereof I affix my signature in presence of two witnesses.

FRANK MARION LIGHT.

Witnesses:
FRANC D. BLACKISTONE,
E. P. BUNYEA.